United States Patent
Crawford

[11] 4,213,352
[45] Jul. 22, 1980

[54] DIFFERENTIAL TRANSMISSION ASSEMBLY

[76] Inventor: Herbert M. Crawford, 1116 N. 8th St., Longview, Tex. 75601

[21] Appl. No.: 886,603

[22] Filed: Mar. 14, 1978

[51] Int. Cl.² ............................................ F16H 47/04
[52] U.S. Cl. ........................................ 74/677; 74/793
[58] Field of Search ................. 74/751, 688, 677, 681, 74/752 C, 793, 794, 718, 730, 731

[56] References Cited

U.S. PATENT DOCUMENTS

| | | | |
|---|---|---|---|
| 2,368,873 | 2/1945 | Pollard | 74/189.5 |
| 2,718,796 | 9/1955 | Gautier | 74/677 |
| 2,821,869 | 2/1958 | Kelbel | 74/763 |
| 2,997,896 | 8/1961 | Preston | 74/688 |
| 3,006,217 | 10/1961 | Dodge | 74/677 X |
| 3,163,056 | 12/1964 | Clarke | 74/677 |
| 3,215,004 | 11/1965 | Bancroft | 74/766 |
| 3,330,392 | 7/1967 | Garay | 74/793 X |
| 3,371,555 | 3/1968 | Tuck et al. | 74/688 X |
| 3,429,200 | 2/1969 | Green | 74/677 |
| 3,670,597 | 6/1972 | Grattan | 74/731 X |

OTHER PUBLICATIONS

"Twin Turbine Nonshifting Torque Converter Transmission", by Buick, illustrated in *McGraw-Hill Encyclopedia of Science and Technology*, vol. 14, copyright 1966, pp. 46–47.

Primary Examiner—Samuel Scott
Assistant Examiner—Randall L. Green
Attorney, Agent, or Firm—Cushman, Darby & Cushman

[57] ABSTRACT

A nonshifting transmission, which may be used in combination with a torque converter, centrifugal clutch, or the like, and a torque converter especially adapted for use with the transmission. The transmission includes first and second input shafts, the second input shaft surrounding and concentric with the first input shaft, and an output shaft coaxial with the first input shaft. A planetary gear arrangement is connected solely to the first and second input shafts and the output shaft; no interconnection with any component stationary relative to the shafts being provided, resulting in a "differential" mechanism. A powered shaft is operatively connected to the first input shaft. First and second relatively movable shaft interconnecting members, such as a pump assembly and turbine assembly of a torque converter, are provided. The powered shaft may be integral with the first input shaft, and the torque converter may comprise turbine blades disposed radially outwardly of the pump impeller blades, and a reactor assembly disposed coaxially with the impeller and turbine blades and at the same radial position as the radial most extent of both. Utilizing the invention, turbine speed can substantially equal impeller speed.

10 Claims, 8 Drawing Figures

DIFFERENTIAL TRANSMISSION ASSEMBLY

BACKGROUND AND SUMMARY OF THE INVENTION

The invention relates to nonshifting transmissions, especially adapted for use in motor vehicles. In the past, commercial nonshifting transmissions have utilized torque converters having two driven turbines and two reactors, the second of which has variable blade positions (the Buick twin turbine transmission; also see U.S. Pat. No. 2,368,873). Other proposals have also been made for the utilization of planetary gears in nonshifting transmissions utilizing hydraulic couplings, dual mechanical clutches, or centrifugal clutches (see U.S. Pat. Nos. 2,821,869 and 3,215,004). In such prior art nonshifting transmissions, component parts of the planetary gear train have of necessity been connected up to stationary components. According to the present invention, however, a transmission has been provided that is truly differential—that is no component parts are connected up to any members that are stationary with respect to the input and output shafts. Such an arrangement can under some circumstances result in easier holding or braking at stops, less tendency of the vehicle with which the transmission is associated to crawl, less consumption of fuel due to easier idling of the motor, and fuel savings in stop-and-go driving. Also, no power is lost in wasteful restraint, rather it is used in useful opposition and passed along to the output mechanism.

According to one aspect of the present invention, a nonshifting transmission assembly is provided including a first input shaft, a second input shaft, an output shaft, a powered shaft operatively connected to the first input shaft, and first and second relatively movable shaft interconnecting members. Means are provided for transforming rotation of the powered shaft into rotation of the output shaft with a gradually decreasing gear ratio as the speed of rotation of the powered and output shafts increase. The transforming means comprises means interconnecting the first input shaft to the first relatively movable member of the interconnecting means, means connecting the second input shaft to the second relatively movable member of the interconnecting means, and planetary gear means connected solely to the first and second input shafts and the output shaft so that no interconnection with any components stationary with respect to the powered shaft and the output shaft is provided.

The first and second input shafts are coaxial, and the interconnecting means may comprise a torque converter, centrifugal clutch, or even a secondary motor hookup. When a torque converter is utilized, preferably the torque converter includes a powered, input shaft, an output shaft, a pump assembly including a rotatable member having impeller blades, a turbine assembly including a rotatable member having turbine blades, the turbine blades disposed radially outwardly of the impeller blades, and a reactor assembly disposed coaxially with the impeller and turbine blades. The reactor assembly has portions disposed at the same radial position as the radial-most extent of both the impeller and turbine blades, and the output shaft surrounds and is concentric with the input shaft. Utilizing the transmission assembly and torque converter according to the invention, it is possible for the turbine of the torque converter to have substantially the same speed as the pump of the turbine assembly. According to another aspect of the present invention, a nonshifting transmission is provided including a first input shaft, a second input shaft surrounding and concentric with the first input shaft, an output shaft coaxial with the first input shaft, and planetary gear means connected solely to the first and second input shafts and the output shaft, so that no interconnection with any component stationary with respect to the input shafts and the output shafts is provided. In one preferred embodiment, the planetary gear means comprises a first sun gear affixed to the first input shaft, a second sun gear affixed to the second input shaft, a first planetary carrier operatively attached to the output shaft, a first planetary gear set operatively connected to the first planetary gear carrier and said first sun gear, and gearing means interconnecting the second sun gear and the first planetary gear set. The gearing means preferably comprises a combination ring gear and planetary carrier, a second planetary gear set, the planetary carrier of the combination ring gear and planetary carrier carrying said second set and the ring gear of the combination planetary carrier and ring gear being in engagement with the first planetary gear set; a third sun gear affixed to said first input shaft; a third planetary gear set; and a double ring gear, the double ring gear in engagement with both the second and third planetary gear sets.

It is the primary object of the present invention to provide a differential, nonshifting transmission assembly, and associated torque converter. This and other objects of the invention will become clear from an inspection of the detailed description of the invention, and from the appended claims.

DETAILED DESCRIPTION OF THE DRAWINGS

Figure 1:
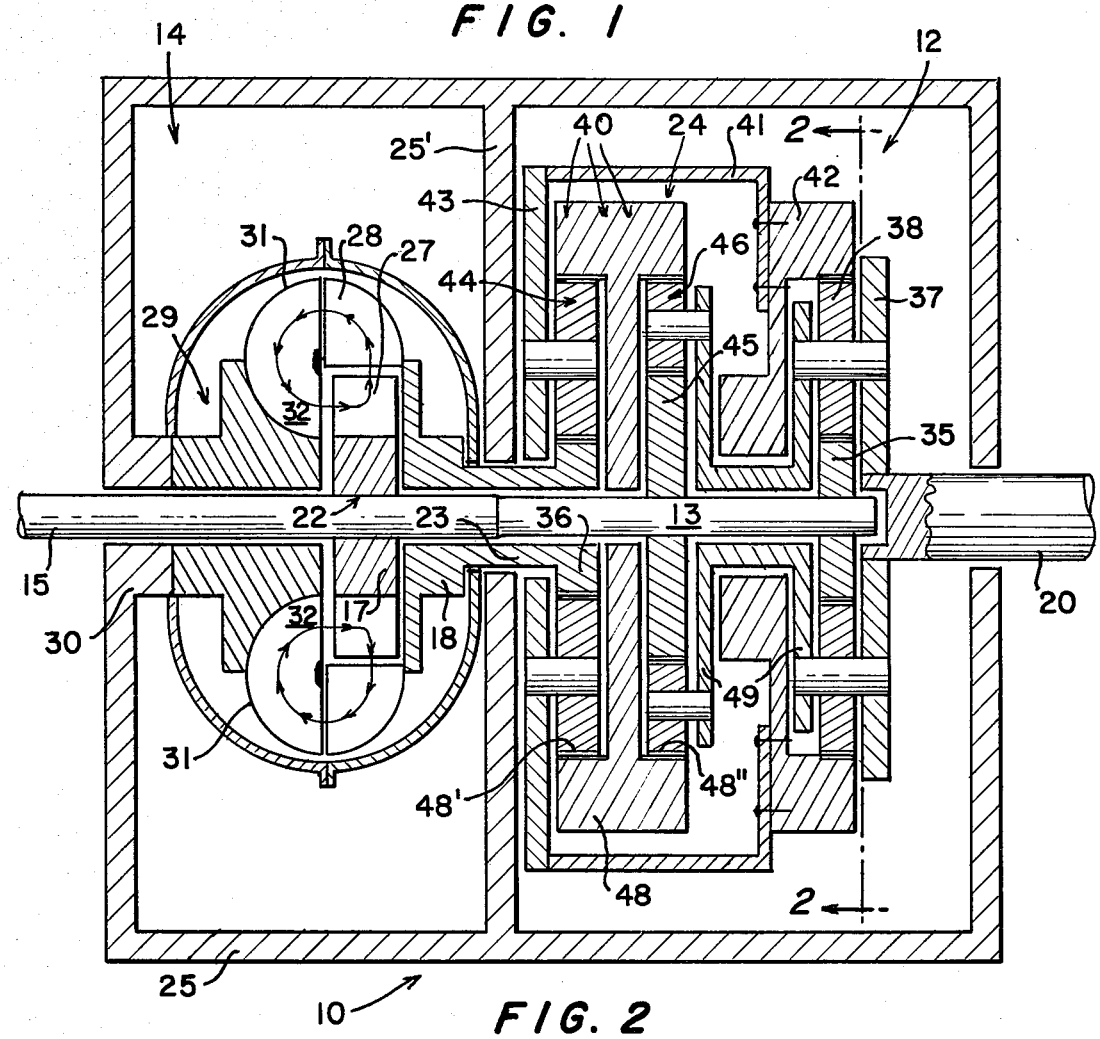
FIG. 1 is a side view, partly in cross section and partly in elevation, of an exemplary transmission assembly, with torque converter, according to the invention.

An exemplary transmission assembly 10 according to the present invention is shown in FIG. 1, including a nonshifting transmission 12, having a first input shaft 13 operatively connected to a powered shaft 15 (connected to the crankshaft of a motor vehicle or like power source), a second input shaft 23, and first and second relatively movable shaft interconnecting members 17 and 18. The transmission 12 comprises means for transforming rotation of the powered shaft 15 into rotation of the output shaft 20 from the transmission 12, with a gradually decreasing gear ratio as the speed of rotation of the powered and output shafts increase, the transforming means including means for interconnecting the first input shaft 13 to the first relatively movable member 17, means for connecting the second input shaft 23 to the second relatively movable member 18, and planetary gear means 24 connected solely to the shafts 13, 23, and 20, so that no interconnection with any component stationary with respect to the powered shaft 15 and the output shaft 20 is provided. The means for interconnecting the first input shaft to the first relatively movable member and the second input shaft to the second relatively movable member are illustrated in the drawings as solid interconnections between the shaft 15 and member 17 as illustrated at 22, and between shaft 23 and member 18 as illustrated at 22' (see FIG. 1), respectively. A stationary casing 25 or the like preferably is provided, which may be attached to the frame of a motor vehicle or the like, bearings being provided at the entry points of the shafts 15,20 into the housing 25. The housing 25 may include a wall 25' separating the interconnecting means 14 from the transmission 12. Structures on either side of the wall 25 may be immersed in fluid.

As shown in FIG. 1, preferably the second input shaft 23 surrounds the first input shaft 13 and is concentric therewith, while the output shaft 20 is coaxial with the first input shaft 13. A bearing may be provided mounting the input shaft 13 in the output shaft 20 for relative rotation.

The interconnecting members may take a wide variety of forms, such as a centrifugal clutch, or even a speed controlled motor connected up to the second movable member. One preferred form for the interconnecting members is a torque converter 14, as illustrated in FIG. 1. In this preferred form—which is the form illustrated in the drawing—the first movable component 17 comprises a pump assembly of the torque converter, including impeller blades 27, and the second movable component 18 comprises a turbine assembly including a single turbine rotor with attached turbine blades 28. Preferably, the powered shaft 15 is integral with the first input shaft 13, the combined shaft 15,13 performing dual functions as will hereinafter be described. The torque converter also includes a reactor assembly 29 which is stationary—for example it can be connected up to the casing 25 by extension 30 or the like. The reactor assembly 29 redirects the fluid discharged from the turbine blades 28 back to the impeller 27, and may merely be formed as an annular, semi-circular in-cross-section, element 31, having generally radially extending stationary vanes 32, the turbine blades 28 and the vanes 32 being shaped as necessary to achieved the desired fluid flow (indicated by the arrows in FIG. 1). For instance, the vanes 32 may be curved, bent, or slanted. While it is preferred that the reactor assembly 29 be stationarily mounted to the casing 25, or the like, it could under some circumstances be allowed to float about the powered shaft 15.

In the torque converter of FIG. 1, the turbine blades 28 are disposed radially outwardly of the impeller blades 27, while the reactor assembly is coaxial with the turbine and impeller blades 28,27 respectively, and has portions thereof disposed at the same radial position as the radial-most extent of both the impeller and turbine blades 27,28 respectively. This is in contradistinction to most conventional torque converters wherein the reactor blades are radially interior. Utilizing the torque converter according to the present invention, only a single turbine rotor 18 need be provided, as opposed to the twin turbine rotors utilizable in conventional non-shifting transmission assemblies (see U.S. Pat. No. 2,368,873).

Other torque converters also are utilizable with the transmission 12 according to the invention.

Figure 2:
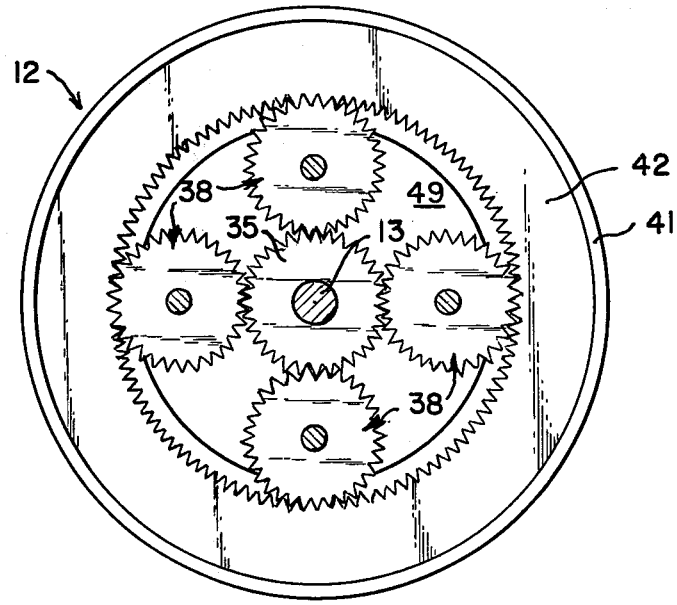
FIG. 2 is a cross sectional view taken along lines 2—2 of FIG. 1.
Figure 3:
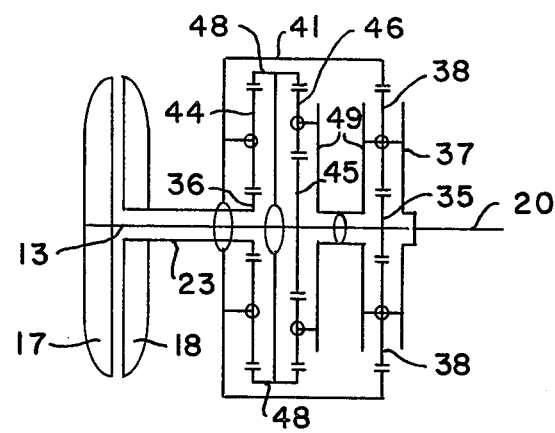
FIG. 3 is a diagrammatic illustration of the transmission of FIG. 1.

A preferred embodiment of the planetary gear means 24 according to the present invention is shown at 24 in FIGS. 1 through 3. Such planetary gear means 24 includes a first sun gear 35 affixed to the first input shaft 13, a second sun gear 36 affixed to the second input shaft 23, a first planetary carrier 37 operatively attached to the output shaft 20, a first planetary gear set 38 operatively connected to the first planetary carrier 37 for rotation with respect thereto, and operatively connected to the first sun gear 35; and gearing means 40 interconnecting the second sun gear 36 to the first planetary gear set 38. The gearing means 40, as shown in FIGS. 1 through 3, comprises a combination ring gear and planetary carrier 41 (element 42 being the ring gear and element 43 the planetary carrier), a second planetary gear set 44 carried by the member 43, and rotatable with respect thereto, and in operative engagement with the second sun gear 36 (the ring gear component 42 being in operative association with the first planetary gear set 38), a third sun gear 45 affixed to the shaft 13, a third planetary gear set 46, and a double ring gear 48 having one ring gear surface 48' thereof in operative association with the second planetary gear set 44, and another ring gear surface 48" thereof in operative association with the third planetary gear set 46. The first and third planetary gear sets 38,46 are keyed together by a common planetary carrier 49, which cooperates with the planetary carrier 37 of the first planetary gear set 38.

The operation of the structure illustrated in FIGS. 1 through 3 would be as follows:

In the idling condition, the powered shaft 15 (and input shaft 13) operate at crankshaft speed in the forward direction. The output shaft 20 is stationary (brakes applied), and the first sun gear 35 with associated first planetary gears 38 will drive the combination planetary carrier and ring gear 41 in a reverse direction at a slower speed. Also, the third sun gear 45 and its planetary gears 46 will cause the double ring gear 48 to turn backwards at a faster rate than the element 41, thus the second planetary gear set 44 and associated sun gear 36 will have the ring gear 48 turning backwards faster than the element 41 and planetary gears 44 are turning backwards. This action causes the second sun gear 36 to turn the turbine rotor 18 of the torque converter 14 in a comparatively slow direction forward. Upon release of the brakes and acceleration of the engine, the increased flow of power through the torque converter 14 to the second sun gear 36 will cause the gears 44 to oppose the backward rotation of the element 41 and the output shaft 20 will begin to turn in the forward direction, slowly at first. This opposition to the backward rotation of the element 41 will continue until backward rotation ceases; then element 41 will be stationary for an instant and then be driven forward until it attains the same speed and direction as the first sun gear 35, in which condition the driven vehicle will have the lowest gear ratio and all parts of the transmission 12 will be locked as a mass of gears (rotating together in a bath of oil or like fluid). If power decreases or load increases, the transmission 12 will unlock and seek a ratio where the engine can keep the load moving without losing speed, thus giving the transmission 12 a continuously and infinitely variable gear ratio. It will be seen that the opposition to backward rotation of the element 41 provided by the second planetary gear set 44 keys or relays the output train into action.

The initial idling forward speed of the turbine 18, as compared to that of the pump 17, can be adjusted at any desirable degree of difference. Careful choice of the gear ratios in the different trains of gears would result in an initial idling forward speed of anywhere from 0 to ⅓ the speed of the pumps 17, although for different applications, a different ratio would be desirable. For instance, for light vehicles the ratio of idling pumps be to turbine speed would be 3 to 1, while for a large truck it would be 4 to 1 or 2 to 1. The initial forward idling speed applied to the turbine 18 may result in easier handling or braking at stops, less tendency of the vehicle to crawl, less consumption of fuel due to easier idling of the motor, and/or fuel savings on in stop-and-go driving.

The diameters and thickness of the transmission gears in FIG. 1 are to scale, although of course a large variety in the gear sizes in possible within the scope of the invention. For the relative gears sizes illustrated in FIG. 1, the first sun gear 35 may have 20 teeth, the second sun gear 36, 20 teeth, the third sun gear 45, 30 teeth, the ring gear surfaces 48', 48", 60 teeth each, the ring gear member 42, 60 teeth, and all of the gears of each of the planetary gear sets 38,44,46, 12 or 15 teeth.

Figure 4:
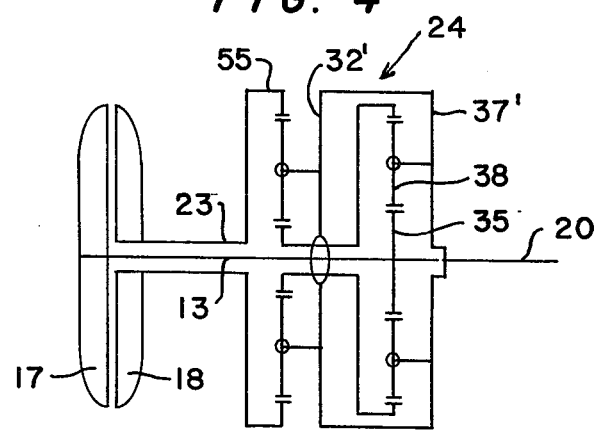
FIGS. 4 through 8 are diagrammatic showings of other exemplary transmissions utilizable according to the present invention.
Figure 5:
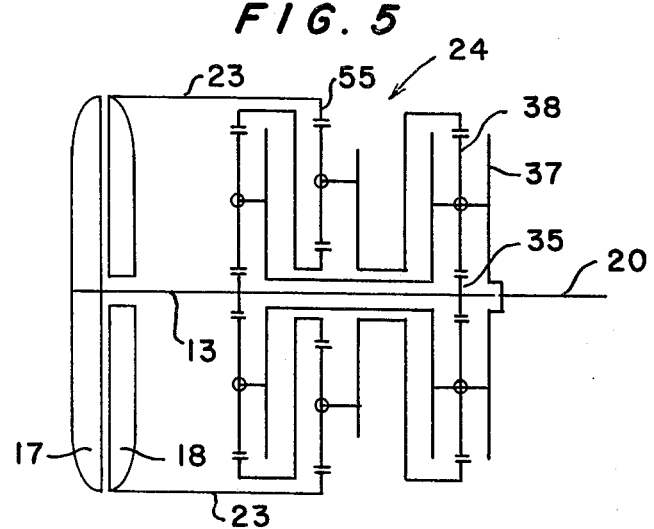
Figure 6:
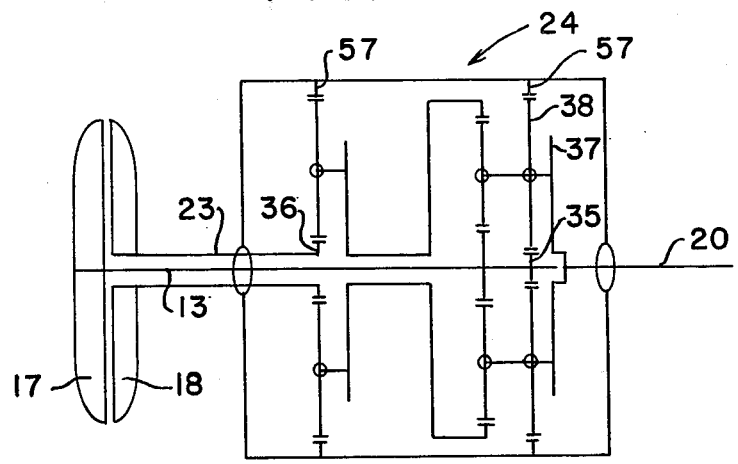
Figure 7:
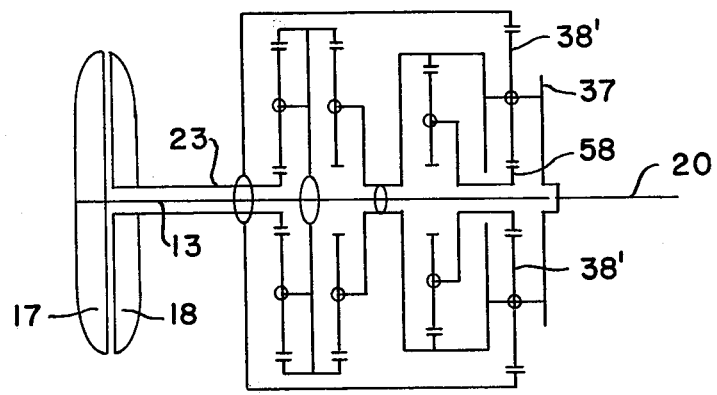
Figure 8:
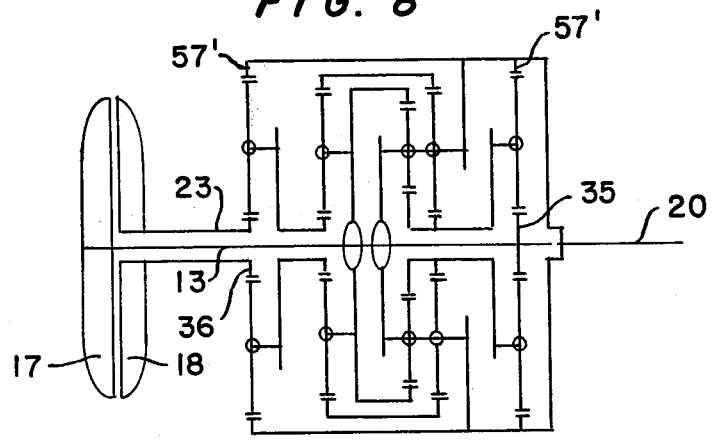

FIGS. 4 through 8 illustrate diagrammatically other exemplary planetary gear means 24 within the scope of the present invention. In FIGS. 5 and 7, the planetary gear means 24 includes a first planetary carrier 37 operatively attached to the output shaft 20, and in FIG. 4 the planetary carrier 37' is a double carrier attached to the output shaft 20. In FIGS. 4 and 5 a ring gear 55 is operatively connected to the second input shaft 23, and a first sun gear 35 is affixed to the first input shaft 13. In FIGS. 6 and 8, the planetary gear means 24 includes a double gear ring 57,57' respectively, the double gearing 57' operatively attached to the output shaft 20 in FIG. 8, and free wheeling with respect to the output shaft 20 and the input shafts 13,23 in FIG. 6. First and second sun gears 35,36 are also provided. In the FIG. 7 embodiment, an arrangement is provided that is intended to reduce the idling speed of the sun gear 58 in the final planetary train. In the FIG. 7 embodiment, no gears are directly connected to the shaft 13. In the FIG. 8 embodiment, a planetary gearing means is provided so that the sun gears 35,36 are geared down for slower idling speed and made more powerful for initial starting and pickup speed. In all embodiments of the invention, conventional structures such as parking lock wheels, speedometer drive gears, and the like may also be associated with the assemblies.

It will thus be seen that according to the present invention a differential transmission assembly has been provided which is of the non-shifting type and has planetary gear means connected solely to the first and second input shafts and the outputs shafts, no interconnection with any component stationary with respect to the input shafts or the output shaft being provided, with associated advantages flowing therefrom. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:
1. A nonshifting transmission comprising
a first input shaft,
a second input shaft surrounding and concentric with said first input shaft,
an output shaft coaxial with said first input shaft, and planetary gear means connected solely to said first and second input shafts and said output shaft so that no interconnection with any component stationary with respect to said input shafts and said output shaft is provided, said planetary gear means comprising a first sun gear affixed to said first input shaft; a first planetary carrier operatively attached to said output shaft; first planetary gears operatively connected to said first planetary carrier and said first sun gear; a second sun gear, affixed to said second input shaft; gearing means interconnecting said second sun gear and said first planetary gears; a combination ring gear and planetary carrier; second planetary gears operatively connected to said second sun gear, the planetary carrier of said combination ring gear and planetary carrier carrying said second planetary gears, and said ring gear of said combination planetary carrier and ring gear in engagement with said first planetary gears; a third sun gear, affixed to said first input shaft; third planetary gears operatively connected to said third sun gear; a double ring gear, said double ring gear in engagement with both said second and third planetary gears; and a planetary carrier common to said first and third planetary gears and operatively connected to said first planetary carrier.

2. A nonshifting transmission assembly comprising
a first, inner, input shaft integral with a powered shaft;
a second, outer, input shaft concentric with said first input shaft;
an output shaft;
first and second relatively movable shaft interconnecting members;
means for transforming rotation of the powered shaft into rotation of said output shaft with a gradually decreasing gear ratio as the speed of rotation of said powered shaft and output shaft increase, said transforming means comprising; means for connecting said first input shaft to said first relatively movable shaft interconnecting member; means for connecting said second input shaft to said second relatively movable shaft interconnecting member; and planetary gear set means connected solely to said first and second input shafts and said output shaft so that no interconnection with any component stationary with respect to the powered shaft and said output shaft is provided; and
said planetary gear set means comprising first and second sun gears; first and second planetary carriers having gears therewith for cooperation with said first and second sun gears; means for connecting said output shaft to said planetary gearing means, said output shaft connecting means consisting of said first and second planetary carriers; and first and second ring gear means for cooperating with the planetary gears of said first and second planetary carriers and having no cooperation with any components stationary with respect to the powered shaft and said output shaft.

3. An assembly as recited in claim 2 wherein said interconnecting members comprise a torque converter, and wherein said first movable component of said torque converter comprises a pump assembly and said second movable component comprises a turbine assembly consisting essentially of a single turbine rotor with attached turbine blades disposed radially outward of said pump assembly.

4. An assembly as recited in claim 2 wherein said first sun gear is connected to said first input shaft and said second sun gear is connected to said second input shaft.

5. An assembly as recited in claims 2, or 4 wherein said first ring gear and said second sun gear are directly connected together for coincident rotation.

6. An assembly as recited in claim 5 wherein said interconnecting members comprise a torque converter, and wherein said first movable component of said torque converter comprises a pump assembly and said second movable component comprises a turbine assembly.

7. An assembly as recited in claim 6 wherein said turbine assembly comprises a single turbine rotor with attached turbine blades.

8. An assembly as recited in claim 7 wherein said pump assembly includes a rotatable member with impeller blades and said turbine includes a rotatable member with turbine blades, and wherein said turbine blades are disposed radially outward of said impeller blades.

9. An assembly as recited in claim 8 wherein said torque converter further comprises a reactor assembly, said reactor assembly disposed coaxially with both said impeller and turbine blades, and having portions disposed at the same radial position as the radialmost extent of both said impeller and said turbine blades, and axially displaced from both.

10. An assembly as recited in claim 8 wherein said transforming means comprises means effecting a maximum rotational speed of said turbine blades substantially the same as the maximum rotational speed of said impeller blades.

* * * * *